United States Patent
Makhseed et al.

(10) Patent No.: US 12,351,465 B1
(45) Date of Patent: Jul. 8, 2025

(54) METHOD FOR PREPARING NITROGEN/SULFUR-DOPED ACTIVATED CARBON

(71) Applicant: KUWAIT UNIVERSITY, Safat (KW)

(72) Inventors: Saad Makhseed, Safat (KW); Mohamed H. Alkordi, Safat (KW)

(73) Assignee: KUWAIT UNIVERSITY, Safat (KW)

( * ) Notice: Subject to any disclaimer, the term of this patent is extended or adjusted under 35 U.S.C. 154(b) by 0 days.

(21) Appl. No.: 18/747,325

(22) Filed: Jun. 18, 2024

(51) Int. Cl.
  *C01B 32/318* (2017.01)
  *C01B 32/17* (2017.01)
  *C01B 32/342* (2017.01)
  *C01B 32/70* (2017.01)

(52) U.S. Cl.
  CPC .............. *C01B 32/70* (2017.08); *C01B 32/17* (2017.08); *C01B 32/318* (2017.08); *C01B 32/342* (2017.08)

(58) Field of Classification Search
  CPC .................................................... C01B 32/318
  See application file for complete search history.

(56) References Cited

U.S. PATENT DOCUMENTS

| | | | | |
|---|---|---|---|---|
| 2004/0009346 A1* | 1/2004 | Jang | ........................ | B82Y 10/00 423/445 B |
| 2017/0304801 A1* | 10/2017 | Ghosh | .................... | B01D 53/04 |

FOREIGN PATENT DOCUMENTS

| | | |
|---|---|---|
| CN | 105140051 A | 12/2015 |
| CN | 110294477 A | 10/2019 |

OTHER PUBLICATIONS

Ruan et al., "Electrochemical performance of activated carbon fiber with hydrogen bond-induced high sulfur/nitrogen doping," RSC Advances, Oct. 12, 2020; 10(62): 37631-37643.

Anfar et al., "New functionalization approach synthesis of Sulfur doped, Nitrogen doped and Co-doped porous carbon: Superior metal-free Carbocatalyst for the catalytic oxidation of aqueous organics pollutants," Chemical Engineering Journal vol. 405, Feb. 1, 2021, 126660.

* cited by examiner

*Primary Examiner* — Stuart L Hendrickson
(74) *Attorney, Agent, or Firm* — Nath, Goldberg & Meyer; Joshua B. Goldberg

(57) ABSTRACT

A method for preparing a nitrogen/sulfur-rich activated carbon, of exceptionally high surface area and microporous nature, the method comprising: preparing an aromatic oligomer including a heteroatom using an oxidative polymerization solution, wherein the oxidative polymerization solution comprises a first oxidizer and an organic solvent; mixing the oligomer with an activating agent to obtain a mixture; subjecting the mixture to carbonization and activation in a tube furnace; holding the mixture at a set temperature; cooling the mixture to room temperature to obtain a carbon material; purifying the carbon material by washing; washing the carbon material with water and methanol; drying the carbon material under vacuum to obtain a microporous carbon of high surface area and nitrogen/sulfur-rich composition.

12 Claims, 8 Drawing Sheets

METHOD FOR PREPARING NITROGEN/SULFUR-DOPED ACTIVATED CARBON

BACKGROUND

1. Field

The present disclosure provides a method for preparing activated carbon, and particularly, to activated carbon doped with nitrogen and sulfur.

2. Description of the Related Art

The increasing demand for both electrical energy and fresh water requires the continuous development of low cost, environmentally friendly and highly efficient materials for supercapacitors (SC) and capacitive deionization (CDI) to meet those demands. The operation of both supercapacitors and capacitive deionization systems includes a series of charging and discharging of electric charges accumulated between positive and negative electrodes, manifested by formation of a charge double layer of surface-bound electrolyte ions on the surface of the conductive electrodes. Thus, performance of such electrodes is tightly entangled with the chemical composition and structural aspects of the electrode's material. Capacitive electrodes do not therefore utilize Faradic processes (chemical redox reactions) as in batteries. They do, however, rely mostly on the ability to hold significant charges per unit area of the electrode, demonstrate high rates of charge storage and dissipation, and demonstrate appreciable performance stability for an extended number of charging and discharging cycles. A combination of the ability to store high charge density at the electrode surface (Non-Faradic process) as well as presence of redox-active species at the electrode material (Faradic processes) results in high energy density electrode material, commonly referred to as pseudo-supercapacitor electrodes.

In the development of supercapacitors and capacitive deionization systems, the specific surface area (SSA), pore size, pore volume and mechanical stability are significant to ensure good performance. Activated carbons are commonly used materials in electrodes for supercapacitors and capacitive deionization systems. These carbons are known for their large surface area, which is due to their highly porous structure. However, activated carbons (AC) as electrode materials distinctly suffer from low energy densities that hinder their practical application. A conventional AC material with a SSA in the range of 1000-2000 $m^2/g$ and a pore size distribution in the range of 2-5 nm, can have a gravimetric capacitance of 100-150 F/g.

Significant research has thus been focused on increasing the carbon's energy density and EDL efficiency as well as lowering the production cost without sacrificing its life expectancy. High surface area carbon films including graphene and graphene-like materials have been identified as promising candidates for use as supercapacitor electrodes. However, it has been observed that the storage capacity of these materials in supercapacitor is intrinsically limited. For example, activated microwave expanded graphite oxide materials having high surface area and energy density have been recently described. These materials, however, may exhibit saturation of capacitance at lower than desirable levels. Similarly, recent investigations of "pristine" monolayer graphene have shown that the area-normalized charge storage of suspended monolayer graphene that can be stored simultaneously on both sides of a graphene monolayer is significantly lower than could be stored on a single side of a graphene monolayer.

Thus, methods for low cost, environmentally friendly and highly efficient materials for preparing supercapacitors (SC) and capacitive deionization (CDI) are needed.

SUMMARY

The present subject matter relates to a method for preparing a highly stable, microporous, nitrogen/sulfur-doped activated carbon (AC) material. In the method, thiazine (TZ) molecules are utilized as cheap soluble precursors to prepare nitrogen and/or sulfur-rich oligomers via cheap electrophilic polymerization (EP), where ferric chloride ($FeCl_3$) is used as a catalyst. The nitrogen and/or sulfur-rich oligomers are converted into microporous activated carbon including nitrogen and/or sulfur ("nitrogen/sulfur-rich activated carbon") through pyrolysis in the presence of an activator selected from the group consisting of potassium hydroxide (KOH), sodium hydroxide (NaOH), and phosphoric acid ($H_3PO_4$), sodium carbonate ($Na_2CO_3$), potassium carbonate ($K_2CO_3$), and ammonium persulfate ($(NH_4)_2S_2O_8$).

The preparation method includes simultaneous steps of polymerization, pyrolysis, and activation to obtain the highly stable, microporous nitrogen/sulfur-rich activated carbon. The material obtained by the method described herein can form an electrode, an energy storage device such as a supercapacitor including such an electrode, as well as devices for capacitive deionization of water.

In an embodiment, the present subject matter relates to a method for enhancing the energy density and electrical double layer efficiency of activated carbons through a highly stable, microporous nitrogen and sulfur-rich-doped activated carbon via a simple, cost-effective, environmentally friendly approach. The activated carbon can be used as electrodes in supercapacitors or capacitive deionization systems from cheap, readily available, and soluble precursors. The material can be easily produced with significantly high specific surface area, pore volume, and desirable pore size distribution, allowing for high electrochemical performance, without sacrificing life expectancy.

In one embodiment, the present subject matter relates to a method for preparing a nitrogen/sulfur-rich activated carbon, the method comprising: preparing an aromatic oligomer including nitrogen (N) and/or sulfur(S) using an oxidative polymerization solution, wherein the oxidative polymerization solution comprises a first oxidizer and an organic solvent; mixing the oligomer with an activating agent to obtain a mixture; subjecting the mixture to carbonization and activation in a tube furnace; holding the mixture at a set temperature for a period of time, e.g., one hour; cooling the mixture, e.g., to room temperature to obtain a carbon material; purifying the carbon material by washing; washing the carbon material with water and methanol; drying the carbon material under vacuum to obtain a carbon network including nitrogen (N) and/or sulfur (S).

In another embodiment, the present subject matter relates to a method for further tuning the nitrogen/sulfur content of the activated carbon through adjusting the mass ratio of different monomers, the method comprising: preparing a hetero oligomer or mixture of oligomers from the selected monomers including nitrogen (N) and/or sulfur (S) using an oxidative polymerization solution, wherein the oxidative polymerization solution comprises a first oxidizer and an organic solvent; mixing the oligomer with an activating agent to obtain a mixture; subjecting the mixture to carbonization and activation in a tube furnace; holding the mixture at a set temperature for a period of time, e.g., one hour; cooling the mixture, e.g., to room temperature to obtain a carbon material; purifying the carbon material by washing; washing the carbon material with water and methanol; drying the carbon material under vacuum to obtain a carbon network including nitrogen (N) and/or sulfur(S).

In another embodiment, the present subject matter is directed to an electrode comprising N and S doped activated carbon.

In an embodiment, present subject matter relates to a supercapacitor comprising electrodes including N and S doped activated carbon.

In an embodiment, the present subject matter relates to an electrochemical device used for capacitive deionization of water comprising an electrode including an aromatic oligomer including nitrogen (N) and/or sulfur(S).

These and other features of the present subject matter will become readily apparent upon further review of the following specification.

DETAILED DESCRIPTION OF THE PREFERRED EMBODIMENTS

Figure 1:
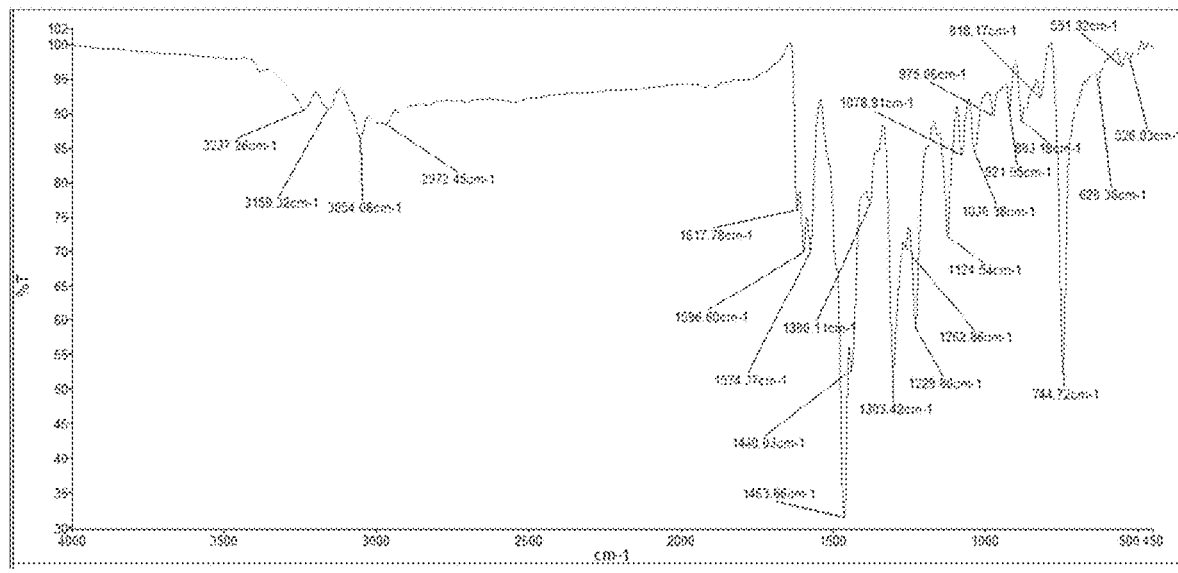
FIG. 1 is a FTIR spectrum of phenothiazine (PTZ)-Oligomer.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps. It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a method of preparing a nitrogen and/or sulfur-doped activated carbon (nitrogen/sulfur-rich activated carbon). The activated carbon can be used in supercapacitors.

As described herein, activated carbon, impregnated with heteroatoms like nitrogen (N) and/or sulfur(S), demonstrated improved surface acidity and basicity, as well as wetting property. Many of the prior methods for preparing nitrogen and/or sulfur-doped carbon materials are limited by multi-step, complicated, and prolonged preparation processes, where costly precursors for both the dopant(s) and carbon materials are utilized and harsh conditions are needed.

The present subject matter relates to a system and method for the preparation of highly stable, microporous nitrogen/sulfur-rich activated carbon as an electrode for supercapacitors and capacitive deionization systems to overcome the shortcomings associated with existing supercapacitor and capacitive deionization technology and carbon materials for use therein.

In an embodiment, the present subject matter relates to enhancing the energy density and electrical double layer efficiency of activated carbon. The process may provide a simple way to ensure the production of nitrogen/sulfur rich activated carbon with a high surface area of 3,454 $m^2/g$ as determined by applying the Brunauer-Emmett-Teller (BET) model to the $N_2$ sorption isotherm of the material. It may also be a highly stable, cost-effective and active material as electrodes for supercapacitor (317.5 F/g) devices. The nitrogen/sulfur rich activated carbon, as described herein, may demonstrate maintained activity over 6,500 cycles of use with no detectable deterioration in specific capacitance in an acidic electrolyte (1M $H_2SO_4$).

The activated carbons, as described herein, demonstrate an impressive stability with porous structure. Properly produced doped activated carbons (e.g. doped with nitrogen and/or sulfur) therefore holds potential for supercapacitor and capacitive deionization applications.

Conventional activated carbon suffers from limited energy density and electric double layer (EDL) efficiency that considerably hinders its practical application. Therefore, activated carbons, rich with nitrogen and sulfur, but with high energy density and EDL efficiency and long-life expectancy, is desirable for supercapacitors.

Also described herein is a simple, cost-effective method for manufacturing dopant-rich activated carbons, including sulfur and nitrogen for the purpose of enhancing their energy density and EDL efficiency, as well as life expectancy. The activated carbons can efficiently charge and discharge in an acidic electrolyte.

The present subject matter provides an enhanced methodology for producing nitrogen/sulfur-rich activated carbon from cheap, soluble precursors (e.g. thiazines) through polymerization and pyrolysis simultaneously, resulting in stable materials that exhibit high specific capacitance for at least 3000 cycles or more, while maintaining high performance.

In one embodiment, the present subject matter relates to a method of preparing an aromatic oligomer including nitrogen (N) and/or sulfur(S) using an oxidative polymerization solution, wherein the oxidative polymerization solution may comprise a first oxidizer and an organic solvent. The method may further include mixing the oligomer with an activating agent to obtain a mixture and subjecting the mixture to carbonization and activation in a tube furnace. The method may further include holding the mixture at a set temperature for a period of time, e.g., about one hour; cooling the mixture to room temperature to obtain a carbon material and purifying the carbon material by washing. The carbon material may be repeatedly washed with water and methanol. The method may further include drying the carbon material under vacuum to obtain nitrogen/sulfur doped activated carbon.

In an embodiment of the present method, the oxidizer may be selected from the group consisting of $FeCl_3$, $AlCl_3$, $FeBr_3$, and ammonium persulfate.

In a further embodiment, the organic solvent may be selected from the group consisting of dimethylformamide, 1,2-dichloroethane, chloroform, 1,2-dichlorobenzene, nitromethane, tetrahydrofuran, N-methylpyrrolidone, dimethyl sulfoxide, nitrobenzene butyl nitrite, and a combination thereof. In an embodiment, the heating rate may be under nitrogen pressure.

In another embodiment, the oligomers may be prepared from monomers comprising nitrogen (N) and/or sulfur(S) atoms. In one embodiment, the oligomers may be prepared from monomers comprising nitrogen (N) atoms. In another embodiment, the oligomers may be prepared from monomers comprising sulfur(S) atoms. In another embodiment, the oligomers may be prepared from monomers comprising nitrogen (N) and sulfur(S) atoms. The monomers can be selected from a group consisting of thiazine, thiophene, aniline, pyrrole, tris-phenylamine, carbazole, and a combination thereof.

In one embodiment, the monomer may be thiazine.

In an embodiment, the activator or activating agent may be selected from the group consisting of KOH, NaOH, $H_3PO_4$, $Na_2CO_3$, $K_2CO_3$, and $(NH_4)_2S_2O_3$.

In one embodiment, a heteroatom weight % in the activated carbon ranges from about 0.1% to about 20 wt %. The heteroatom weight % may further be within a range of about 0.5% to about 18 wt %. The heteroatom weight % may also be within a range of about 1% to about 15 wt %

In a further embodiment, the nitrogen/sulfur-rich activated carbon is a free-flowing black powder.

In another embodiment, the free-flowing black powder may have a high surface area exceeding 2,500 $m^2/g$, and more preferably exceeding 3,000 $m^2/g$, even more preferably exceeding 3,200 $m^2/g$.

In a further embodiment, the method may also include tuning the nitrogen/sulfur content of the activated carbon by adjusting the ratio of the different monomers.

In another embodiment, the present subject matter relates to a method for further tuning the nitrogen/sulfur content of the activated carbon through adjusting the mass ratio of different monomers, the method comprising: preparing a hetero oligomer or mixture of oligomers from the selected monomers including nitrogen (N) and/or sulfur(S) using an oxidative polymerization solution, wherein the oxidative polymerization solution comprises a first oxidizer and an organic solvent; mixing the oligomer with an activating agent to obtain a mixture; subjecting the mixture to carbonization and activation in a tube furnace; holding the mixture at a set temperature for a period of time, e.g., one hour; cooling the mixture, e.g., to room temperature to obtain a carbon material; purifying the carbon material by washing; washing the carbon material with water and methanol;

drying the carbon material under vacuum to obtain a carbon network including nitrogen (N) and/or sulfur(S).

The nitrogen/sulfur-rich activated carbon made according to the methods described herein may have a specific capacitance of 317 F/g and a surface area of 2,761 m$^2$/g.

The present subject matter may relate to an electrode comprising the nitrogen/sulfur-rich activated carbon. The nitrogen/sulfur-rich activated carbon may be prepared according to the methods described herein. In an embodiment, the electrode may have a specific capacitance of more than 200 F/g. In another embodiment, the electrode may have a specific capacitance of more than 150 F/g. In a further embodiment, the electrode has a specific capacitance of more than 100 F/g.

The present subject matter also relates to an electrochemical device used for capacitive deionization of water comprising electrodes as described herein.

The following examples illustrate the present teachings.

EXAMPLES $^1$H and $^{13}$C NMR and magic-angle spin (MAS) spectra were obtained using a Bruker AVANCE II 600 MHz instrument. High resolution mass determination was performed on GC-MS DFS Thermo instrument. FT-IR spectra were measured using a JASCO FTIR 6300. Thermogravimetric analysis (TGA) was performed on a SHIMAZDU DTG-60 thermal analyzer at a heating rate of 10° C. min$^{-1}$ under nitrogen atmosphere. The FE-SEM analysis was carried out on a JEOL model JSM-7001F scanning electron microscope. X-ray photelectron spectroscopy (XPS) was measured on a ESCALAB 250Xi XPS/UPS System by using AlKa source with a spot size range of 200-850 µm. N$_2$ adsorption-desorption isotherms were measured using Micromeritics ASAP 2020 accelerated surface area and porosimetry equipped with ultimate vacuum less than 10$^{-8}$ mbar. All gases (N$_2$ and CO$_2$) used were of ultra-high purity (UHP, grade 6.0, 99.9999%).

Example 1

General Procedure for Phenothiazine (PTZ) Oxidative Polymerization

Oligo-phenothiazine was prepared by oxidative polymerization of phenothiazine in dichloromethane using FeCl$_3$. A suspension of the FeCl$_3$ as oxidizing agent (1 g) in dichloromethane (25 mL) was added dropwise to the solution of phenothiazine (1 g) in dichloromethane (25 mL). The resulting mixture was stirred for 48 hours at room temperature, and the solvent was then evaporated under reduced pressure. The resultant green solid material was washed with water, followed by aqueous methanol to remove the excess catalyst and other impurities. Then, it was dried at 50° C. for 12 hours in a vacuum oven.

Example 2

Synthesis of the phenothiazine (PTZ)-Carbon 600

Oligo-(PTZ) phenothiazine (500 mg) was well grounded with potassium hydroxide (2 g) (1:4 by weight ratio) using a pestle and mortar and the resultant mixture was subjected to carbonization in a tube furnace at 600° C., heating rate of 5° C./min under nitrogen atmosphere, and held at a 600° C. for 1 hour, then finally cooled down to room temperature, producing the carbon material. Purification was accomplished by washing with 1M HCl. Then, the carbon material was further washed repeatedly with deionized water and methanol and dried under vacuum at 120° C. for 24 hours to give the nitrogen/sulfur-rich activated carbon as a free-flowing black powder, denoted as phenothiazine (PTZ)-Carbon_600.

Example 3

Synthesis of the PTZ-Carbon 800

Oligo-(PTZ) phenothiazine (500 mg) was well-ground with potassium hydroxide (2 g) (1:4 by weight ratio) using a pestle and mortar. The resultant mixture was subjected to carbonization in a tube furnace at 800° C., heating rate of 5° C./min under nitrogen atmosphere, and held at a 800° C. for 1 hour, then finally cooled down to room temperature, producing the carbon material. Purification was accomplished by washing with 1M HCl. Then, the carbon material was further washed repeatedly with deionized water and methanol and dried under vacuum at 120° C. for 24 h to give the nitrogen/sulfur-rich activated carbon as a free-flowing black powder denoted as PTZ-Carbon_800.

Example 4

Synthesis of the PTZ-Carbon 900

Oligo-phenothiazine (500 mg) was well ground with potassium hydroxide (2 g) (1:4 by weight ratio) using a pestle and mortar. The resultant mixture was subjected to carbonization in a tube furnace at 900° C., heating rate of 5° C./min under nitrogen atmosphere, held at 900° C. for 1 hour, and then finally cooled to room temperature, producing the carbon material. Purification was accomplished by washing with 1M HCl. Then, the carbon material was further washed repeatedly with deionized water and methanol and dried under vacuum at 120° C. for 24 hours to give the nitrogen/sulfur-rich activated carbon as a free-flowing black powder, denoted as PTZ-Carbon_900.

Example 5

Synthesis of the PTZ-Carbon 600 K$_2$CO$_3$

Oligo-phenothiazine (500 mg) was well ground with potassium carbonate (2 g) (1:4 by weight ratio) using a pestle and mortar and the resultant mixture was subjected to carbonization in a tube furnace at 600° C., heating rate of 5° C./min under nitrogen atmosphere, and held at a 600° C. for 1 hour, then finally cooled down to room temperature, producing the carbon material. Purification was accomplished by washing with 1M HCl. Then, the carbon material was further washed repeatedly with deionized water and methanol, and dried under vacuum at 120° C. for 24 hours to give the nitrogen/sulfur-rich activated carbon as a free-flowing black powder, denoted as PTZ-Carbon_600.

Example 6

Synthesis of the PTZ-Carbon 800 K$_2$CO$_3$

Oligo-phenothiazine (500 mg) was well ground with potassium carbonate (2 g) (1:4 by weight ratio) using a pestle and mortar, and the resultant mixture was subjected to carbonization in a tube furnace at 800° C., heating rate of 5° C./min under nitrogen atmosphere, held at a 800° C. for 1 hour, then finally cooled down to room temperature, producing the carbon material. Purification was accomplished by washing with 1M HCl. Then, the carbon material was further washed repeatedly with deionized water and methanol and dried under vacuum at 120° C. for 24 hours to give the nitrogen/sulfur-rich activated carbon as a free-flowing black powder, denoted as PTZ-Carbon_800.

Example 7

Synthesis of the PTZ-Carbon 900 $K_2CO_3$

Oligo-phenothiazine (500 mg) was well ground with potassium carbonate (2 g) (1:4 by weight ratio) using a pestle and mortar and the resultant mixture was subjected to carbonization in a tube furnace at 900° C., heating rate of 5° C./min under nitrogen atmosphere, and held at a 900° C. of 1 hour, then finally cooled down to room temperature, producing the carbon material. Purification was accomplished by washing with 1M HCl. Then, the carbon material was further washed repeatedly with deionized water and methanol and dried under vacuum at 120° C. for 24 hours to give the nitrogen/sulfur-rich activated carbon as a free-flowing black powder, denoted as PTZ-Carbon_900.

Example 8

General Procedure for Phenothiazine-Thiophene Oxidative Polymerization

Oligo-phenothiazine-thiophene was prepared by oxidative polymerization of a mixture of phenothiazine and thiophene in dichloromethane using $FeCl_3$. A suspension of $FeCl_3$ as oxidizing agent (1 g) in dichloromethane (25 ml) was added dropwise to the solution of phenothiazine (1 g) and thiophene (0.42 g) in dichloromethane (25 ml). The mixture was stirred for 48 hours at room temperature, and the solvent was then evaporated under reduced pressure. The resultant green solid material was washed with water, followed by aqueous methanol to remove the excess catalyst and other impurities. Then, it was dried at 50° C. for 12 hours in a vacuum oven.

Example 9

Synthesis of the PTZ-TP Carbon 600 $K_2CO_3$

Oligo-phenothiazine-thiophene (500 mg) was well ground with potassium carbonate (2 g) (1:4 by weight ratio) using a pestle and mortar and the resultant mixture was subjected to carbonization in a tube furnace at 600° C., heating rate of 5° C./min under nitrogen atmosphere, held at a 600° C. for 1 hour, then finally cooled to room temperature, producing the carbon material. Purification was accomplished by washing with 1M HCl. Then, the carbon material was further washed repeatedly with deionized water and methanol and dried under vacuum at 120° C. for 24 hours to give the nitrogen/sulfur-rich activated carbon as a free-flowing black powder, denoted as PTZ-TP_Carbon_600.

Example 10

Synthesis of the PTZ-TP Carbon 800 $K_2CO_3$

Oligo-phenothiazine-thiophene (500 mg) was well ground with potassium carbonate (2 g) (1:4 by weight ratio) using a pestle and mortar and the resultant mixture was subjected to carbonization in a tube furnace at 800° C., heating rate of 5° C./min under nitrogen atmosphere, held at a 800° C. of 1 hour, and then finally cooled down to room temperature, producing the carbon material. Purification was accomplished by washing with 1M HCl. Then, the carbon material was further washed repeatedly with deionized water and methanol and dried under vacuum at 120° C. for 24 hours to give the nitrogen/sulfur-rich activated carbon as a free-flowing black powder, denoted as PTZ-TP_Carbon_800.

Example 11

Synthesis of the PTZ-TP_Carbon 900_$K_2CO_3$

Oligo-phenothiazine-thiophene (500 mg) was well ground with potassium carbonate (2 g) (1:4 by weight ratio) using a pestle and mortar and the resultant mixture was subjected to carbonization in a tube furnace at 900° C., heating rate of 5° C./min under nitrogen atmosphere, and held at a 900° C. of 1 hour, then finally cooled down to room temperature, producing the carbon material. Purification was accomplished by washing with 1M HCl. Then, the carbon material was further washed repeatedly with deionized water and methanol and dried under vacuum at 120° C. for 24 hours to give the nitrogen/sulfur-rich activated carbon as a free-flowing black powder, denoted as PTZ-TP_Carbon_900.

Example 12

General Procedure for Phenothiazine-Pyrrole Oxidative Polymerization

Oligo-phenothiazine-pyrrole was prepared by oxidative polymerization of a mixture of phenothiazine and thiophene in dichloromethane using $FeCl_3$. A suspension of the $FeCl_3$ as oxidizing agent (1 g) in dichloromethane (25 mL) was added dropwise to the solution of phenothiazine (1 g) and pyrrole (0.37 g) in dichloromethane (25 mL). The mixture was stirred for 48 hours at room temperature, and the solvent was then evaporated under reduced pressure. The resultant green solid material was washed with water, followed by aqueous methanol to remove the excess catalyst and other impurities. Then, it was dried at 50° C. for 12 hours in a vacuum oven.

Example 13

Synthesis of the PTZ-Py Carbon 600 $K_2CO_3$

Oligo-phenothiazine-pyrrole (500 mg) was well ground with potassium carbonate (2 g) (1:4 by weight ratio) using a pestle and mortar and the resultant mixture was subjected to carbonization in a tube furnace at 600° C., heating rate of 5° C./min under nitrogen atmosphere, and held at a 600° C. of 1 hour, then finally cooled to room temperature, producing the carbon material. Purification was accomplished by washing with 1M HCl. Then, the carbon material was further washed repeatedly with deionized water and methanol and dried under vacuum at 120° C. for 24 hours to give the nitrogen/sulfur-rich activated carbon as a free-flowing black powder, denoted as PTZ-Py_Carbon_600.

Example 14

Synthesis of the PTZ-Py Carbon 800 $K_2CO_3$

Oligo-phenothiazine-pyrrole (500 mg) was well ground with potassium carbonate (2 g) (1:4 by weight ratio) using a pestle and mortar and the resultant mixture was subjected to carbonization in a tube furnace at 800° C., heating rate of 5° C./min under nitrogen atmosphere, and held at a 800° C. for 1 hour, then finally cooled to room temperature, producing the carbon material. Purification was accomplished by washing with 1M HCl. Then, the carbon material was further washed repeatedly with deionized water and methanol and dried under vacuum at 120° C. for 24 hours to give the nitrogen/sulfur-rich activated carbon as a free-flowing black powder, denoted as PTZ-Py_Carbon_800.

Example 15

Synthesis of the PTZ-Py Carbon 900 $K_2CO_3$

Oligo-phenothiazine-pyrrole (500 mg) was well ground with potassium carbonate (2 g) (1:4 by weight ratio) using a pestle and mortar. The resultant mixture was subjected to carbonization in a tube furnace at 900° C., heating rate of 5° C./min under nitrogen atmosphere, and held at a 900° C. of 1 hour, then finally cooled down to room temperature, producing the carbon material. Purification was accomplished by washing with 1M HCl. Then, the carbon material was further washed repeatedly with deionized water and methanol and dried under vacuum at 120° C. for 24 hours to give the nitrogen/sulfur-rich activated carbon as a free-flowing black powder, denoted as PTZ-Py_Carbon_900.

Example 16

Synthesis of the PTZ Carbon 600 $(NH_4)_2S_2O_8$

Oligo-phenothiazine (500 mg) was well ground with ammonium persulfate (2 g) (1:4 by weight ratio) using a pestle and mortar and the resultant mixture was subjected to carbonization in a tube furnace at 600° C., heating rate of 5° C./min under nitrogen atmosphere, and held at a 600° C. for 1 hour then finally cooled down to room temperature, producing the carbon material. Purification was accomplished by washing with 1M HCl. Then, the carbon material was further washed repeatedly with deionized water and methanol and dried under vacuum at 120° C. for 24 hours to give the nitrogen/sulfur-rich activated carbon as a free-flowing black powder, denoted as PTZ-Carbon_600.

Example 17

Synthesis of the PTZ-Carbon 800 $(NH_4)_2S_2O_8$

Oligo-phenothiazine (500 mg) was well ground with ammonium persulfate (2 g) (1:4 by weight ratio) using a pestle and mortar. The resultant mixture was subjected to carbonization in a tube furnace at 800° C., heating rate of 5° C./min under nitrogen atmosphere, held at a 800° C. for 1 hour, then finally cooled down to room temperature, producing the carbon material. Purification was accomplished by washing with 1M HCl. Then, the carbon material was further washed repeatedly with deionized water and methanol and dried under vacuum at 120° C. for 24 h to give the nitrogen/sulfur-rich activated carbon as a free-flowing black powder, denoted as PTZ-Carbon_800.

Example 18

Synthesis of the PTZ-Carbon 900 $(NH_4)_2S_2O_8$

Oligo-phenothiazine (500 mg) was well ground with ammonium persulfate (2 g) (1:4 by weight ratio) using a pestle and mortar. The resultant mixture was subjected to carbonization in a tube furnace at 900° C., heating rate of 5° C./min under nitrogen atmosphere, held at a 900° C. for 1 hour, then finally cooled to room temperature, producing the carbon material. Purification was accomplished by washing with 1M HCl, then the carbon material was further washed repeatedly with deionized water and methanol and dried under vacuum at 120° C. for 24 h to give the nitrogen/sulfur-rich activated carbon as a free-flowing black powder, denoted as PTZ-Carbon_900.

Example 19

Synthesis of the PTZ-TP Carbon 600 $(NH_4)_2S_2O_8$

Oligo-phenothiazine-thiophene (500 mg) was well ground with ammonium persulfate (2 g) (1:4 by weight ratio) using a pestle and mortar. The resultant mixture was subjected to carbonization in a tube furnace at 600° C., heating rate of 5° C./min under nitrogen atmosphere, and held at a 600° C. of 1 hour then finally cooled to room temperature, producing the carbon material. Purification was accomplished by washing with 1M HCl. Then, the carbon material was further washed repeatedly with deionized water and methanol and dried under vacuum at 120° C. for 24 hours to give the nitrogen/sulfur-rich activated carbon as a free-flowing black powder, denoted as PTZ-TP_Carbon_600.

Example 20

Synthesis of the PTZ-TP Carbon 800 $(NH_4)_2S_2O_8$

Oligo-phenothiazine-thiophene (500 mg) was well ground with ammonium was subjected to carbonization in a tube furnace at 800° C., heating rate of 5° C./min under nitrogen atmosphere, and held at 800° C. for 1 hour, then finally cooled to room temperature, producing the carbon material. Purification was accomplished by washing with 1M HCl. Then, the carbon material was further washed repeatedly with deionized water and methanol and dried under vacuum at 120° C. for 24 hours to give the nitrogen/sulfur-rich activated carbon as a free-flowing black powder, denoted as PTZ-TP_Carbon_800.

Example 21

Synthesis of the PTZ-TP Carbon 900 $(NH_4)_2S_2O_8$

Oligo-phenothiazine-thiophene (500 mg) was well ground with ammonium persulfate (2 g) (1:4 by weight ratio) using a pestle and mortar and the resultant mixture was subjected to carbonization in a tube furnace at 900° C., heating rate of 5° C./min under nitrogen atmosphere, and held at a 900° C. of 1 hour then finally cooled down to room temperature, producing the carbon material. Purification was accomplished by washing with 1M HCl. Then, the carbon material was further washed repeatedly with deionized water and methanol and dried under vacuum at 120° C. for 24 hours to give the nitrogen/sulfur-rich activated carbon as a free-flowing black powder, denoted as PTZ-TP_Carbon_900.

Example 22

Synthesis of the PTZ-Py Carbon 600 $(NH_4)_2S_2O_8$

Oligo-phenothiazine-pyrrole (500 mg) was well ground with ammonium was subjected to carbonization in a tube furnace at 600° C., heating rate of 5° C./min under nitrogen atmosphere, and held at a 600° C. for 1 hour, then finally cooled to room temperature, producing the carbon material. Purification was accomplished by washing with 1M HCl. Then, the carbon material was further washed repeatedly with deionized water and methanol and dried under vacuum at 120° C. for 24 hours to give the nitrogen/sulfur-rich activated carbon as a free-flowing black powder, denoted as PTZ-Py_Carbon_600.

Example 23

Synthesis of the PTZ-Py Carbon 800 $(NH_4)_2S_2O_8$

Oligo-phenothiazine-pyrrole (500 mg) was well ground with ammonium persulfate (2 g) (1:4 by weight ratio) using a pestle and mortar. The resultant mixture was subjected to carbonization in a tube furnace at 800° C., heating rate of 5° C./min under nitrogen atmosphere, and held at a 800° C. for 1 hour, then finally cooled to room temperature, producing the carbon material. Purification was accomplished by washing with 1M HCl. Then, the carbon material was further washed repeatedly with deionized water and methanol and dried under vacuum at 120° C. for 24 hours to give the nitrogen/sulfur-rich activated carbon free-flowing black powder, denoted as PTZ-Py_Carbon_800.

Example 24

Synthesis of the PTZ-Py Carbon 900 $(NH_4)_2S_2O_8$

Oligo-phenothiazine-pyrrole (500 mg) was well ground with ammonium was subjected to carbonization in a tube furnace at 900° C., heating rate of 5° C./min under nitrogen atmosphere, and held at a 900° C. for 1 hour, then finally cooled to room temperature, producing the carbon material. Purification was accomplished by washing with 1M HCl. Then, the carbon material was further washed repeatedly with deionized water and methanol and dried under vacuum at 120° C. for 24 hours to give free-flowing black powder denoted as PTZ-Py_Carbon_900.

Example 25

Ink Preparation for Electrochemical Characterization

A sample of the graphitized carbon (about 4.186 mg) was dispersed in 0.5 ml of isopropanol and sonicated for 10 minutes. 5 µl of Nafion was then added to the suspension, followed by socication for another 10 minutes. A portion of 20 µl of the prepared ink was drop casted on a glassy carbon electrode. For testing the commercial activated carbon (AC), 4.109 mg of the AC was dispersed and drop casted the same way as described herein for the graphitized carbon.

Figure 2:
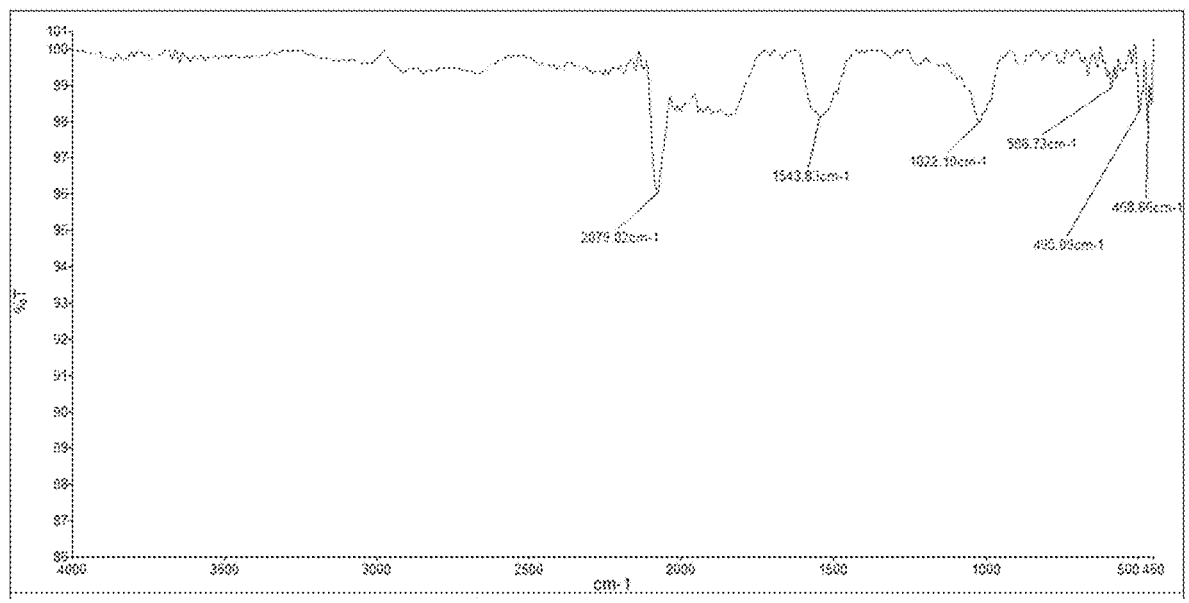
FIG. 2 is a FTIR spectrum of phenothiazine (PTZ)_Carbon_800.

The FT-IR spectra of the PTZ-Oligomers demonstrated N—H stretching and N—H bending frequency at 3237 cm$^{-1}$ and 1574 cm$^{-1}$, respectively. The C—C aromatic stretching frequency was observed at 1596-1617 cm$^{-1}$ (FIG. 1) while the C—S and C—N stretching frequencies were observed in the range of 1036 cm-1 to 1303 cm$^{-1}$. Aromatic C—H stretching frequency was also observed at 2972 cm-1 and 3054 cm$^{-1}$. The FTIR spectrum of PTZ-Carbon_800 is shown in FIG. 2. The prepared carbon material showed a peak at 1543 cm$^{-1}$ representing the polyaromatic C=C stretching vibrations. The C=C and C=N stretching was observed as medium peak at 2079 cm$^{-1}$. The FT-IR spectrum of the PTZ-Carbon_800 evidently confirmed the formation of carbon materials of extended conjugation nature.

To confirm the formation of the PTZ-Oligomers, 1H-NMR spectra were recorded. The oligomer exhibited all the signals characteristic of a phenothiazine unit. The proton signal observed at 11 ppm is ascribed to the N—H proton of the phenothiazine ring which confirmed the presence of N—H proton retained throughout the repeated units. For polymers or oligomers, the resonance signals from repeating units often coalesce as broad peaks owing to the poor molecular rotation and repeating units being situated in marginally different chemical environments. Here, the broad peaks obtained for PTZ-oligomer confirmed the existence of repeated units. Mass spectrometry was also used to probe the soluble PTZ-oligomeric species. The ESI-mass spectrum of the soluble PTZ-Oligomers demonstrated main peaks at m/z of 396.08, and 198.04, that could be ascribed to dimeric, and monomeric fragments of the oligomeric species. Interestingly, the peak at m/z=198.04 is one mass unit lower than the molecular ion peak of the phenothiazine (observed at m/z=199.02), indicating a C—C cession leading to the detection of this signal recorded at 198.08. Similarly, the peaks at 396.08 could be assigned to C—C cession from the oligomeric backbone leading to the ionization and detection of dimeric phenothiazine units.

The thermal stability of the oligomeric material was investigated by thermogravimetric (TGA) analysis, recorded for PTZ-Oligomer under nitrogen atmosphere. The TGA trace demonstrated merely 3% weight loss observed up to 300° C. and the maximum weight loss of 24% commenced at 350° C.-400° C., indicating that the prepared PTZ-Oligomers are thermally stable, and that annealing can effectively be conducted at a temperature above 400° C.

Figure 3A:
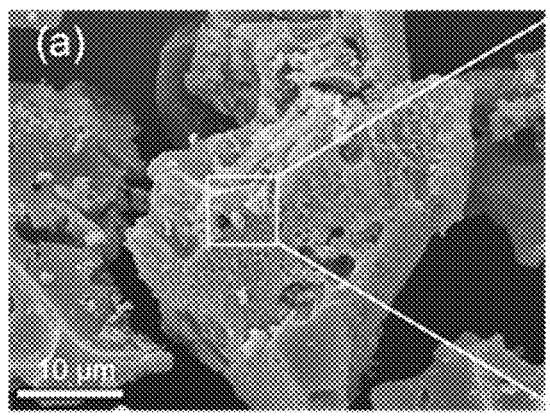
FIG. 3A is a SEM image of phenothiazine (PTZ)-Carbon_600 at a magnification of 10 μm.
Figure 3B:
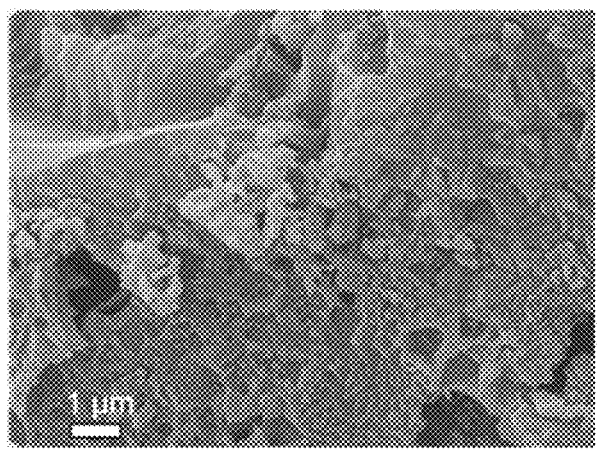
FIG. 3B is a SEM image of an embodiment of phenothiazine (PTZ)-Carbon_600 at 1 μm.
Figure 3C:
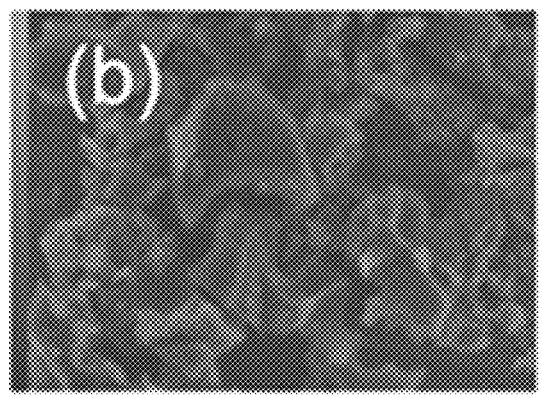
FIG. 3C is a EDX map showing uniform distribution of N within a sample of PTZ-Carbon_600.
Figure 3D:
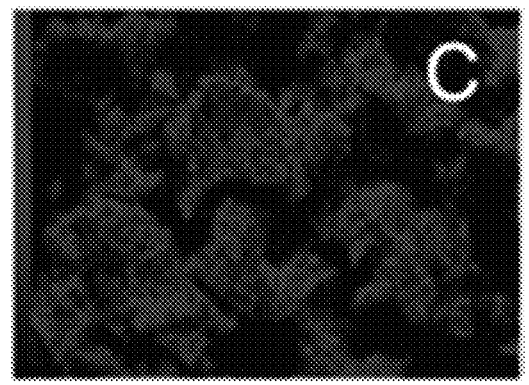
FIG. 3D is a EDX map showing uniform distribution of C within a sample of PTZ-Carbon_600.
Figure 3E:
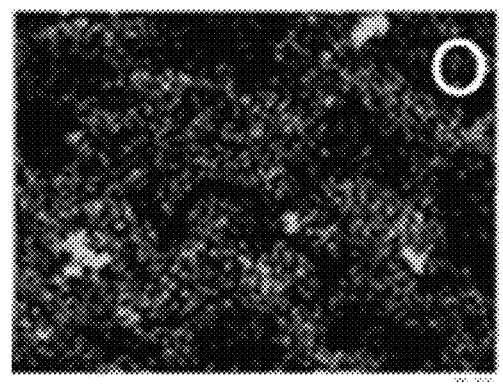
FIG. 3E is a EDX map showing uniform distribution of O within a sample of PTZ-Carbon_600.
Figure 3F:
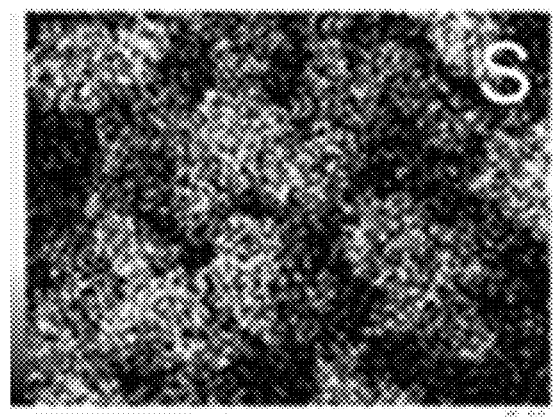
FIG. 3F is a EDX map showing uniform distribution of S within a sample of PTZ-Carbon_600.

Scanning electron microscopy (SEM) and energy dispersive x-ray spectroscopy (EDX) were utilized to examine the morphology and the elemental composition of the prepared PTZ-Carbon. The SEM images of the PTZ-Carbon_800 indicated formation of smooth surface particles, with no evident macroscopic cavities, as shown in FIGS. 3A-3C. The EDX elemental maps (C, N, S, O) clearly demonstrated homogeneous distribution of the N- and S-dopants throughout the particles of the PTZ-Carbon_800, as illustrated in FIGS. 3D-3F.

To elucidate the chemical structures of the prepared materials, X-ray photoelectron spectroscopy (XPS) was employed. The XPS spectra of the KOH activated PTZ-Carbon_800 is shown in FIGS. 4A-4D, which confirmed the presence of carbon, nitrogen, sulfur and oxygen atoms. The survey spectrum recorded indicated elemental composition, reported as atomic %, of C (83.16), O (10.39), N (1.12), S (4.60), and Fe (0.73). The high-resolution C1s spectrum could be deconvoluted into its components of sp$^2$-hybridized carbon (C=C bond) observed at 284.6 eV, an additional relatively broad peak at 285.5 eV corresponding to C—O, C—N, and C—S as well as a broad peak at 287.5 eV corresponding to carbonyl (C=O) bonds. The high-resolution N1s spectrum can also be deconvoluted into three different chemical environments that can be assigned to pyridinic N (397.6 eV), pyrrolic N (398.7 eV), and graphitic N (400.3 eV). The high-resolution S2p spectrum can be deconvoluted into four different peaks. The peaks observed at 163.9 and 165.2 eV can be ascribed to sulfide groups, while those observed at 168.4.9 and 169.8.2 eV correspond to oxidized sulfur groups. The XPS data clearly indicated S- and N-doped graphitic carbon, where the presence of these heteroatoms can be beneficial for energy storage applications.

Figure 4A:
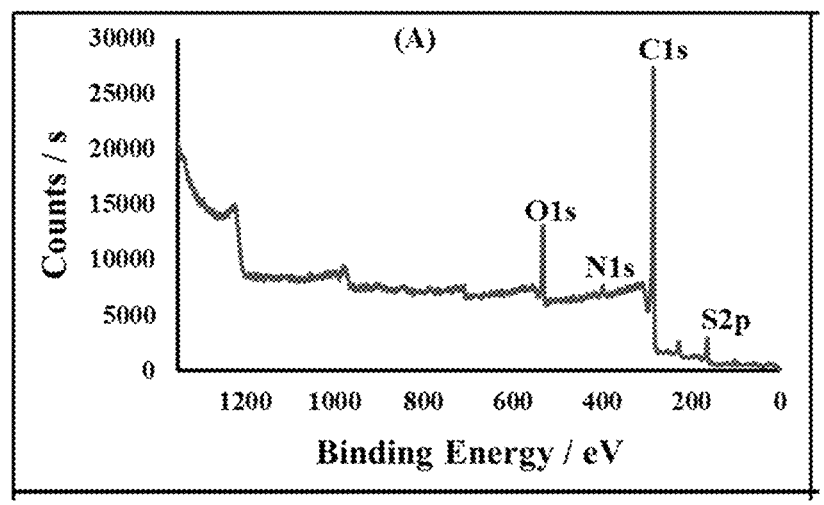
FIG. 4A shows a XPS spectra of the PTZ-Carbon_800 showing a detailed survey spectrum.
Figure 4B:
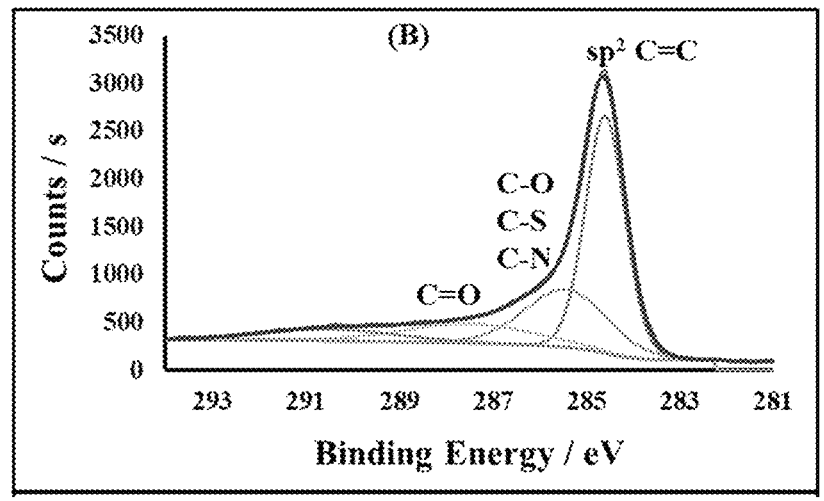
FIG. 4B shows a XPS spectra of PTZ-Carbon_800 showing a C 1s spectrum.
Figure 4C:
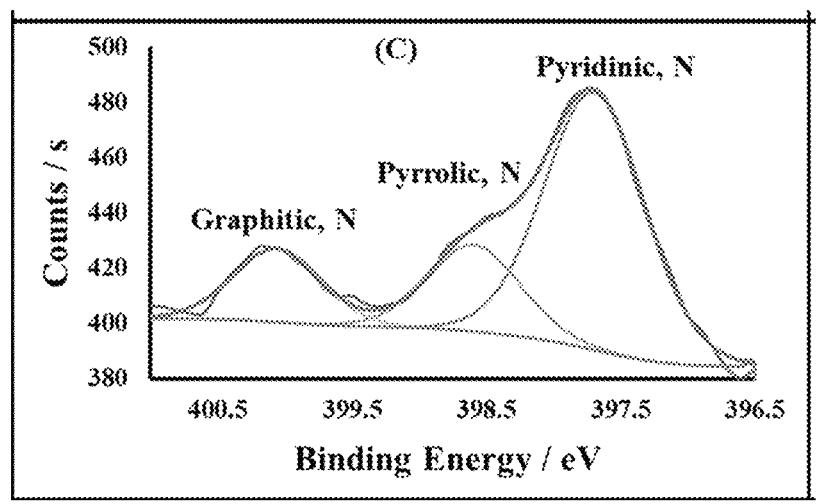
FIG. 4C shows a XPS spectra of PTZ-Carbon_800 showing a N 1s spectrum.
Figure 4D:
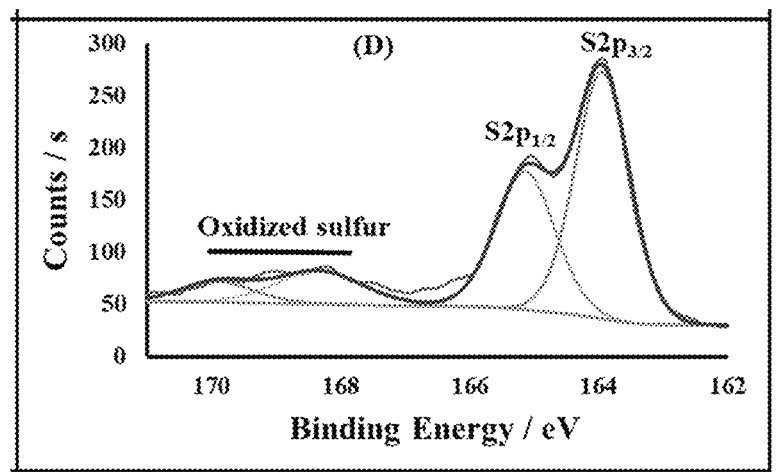
FIG. 4D shows a XPS spectra of PTZ-Carbon_800 showing N S2p spectrum.

The textural properties of the prepared PTZ-Carbon_800 was examined by nitrogen adsorption-desorption isotherm measured at 77 K. As shown in FIGS. 4A-4B, the resulting carbonaceous material demonstrated nitrogen gas sorption isotherms with a sharp nitrogen gas uptake at relatively low pressure (P/P0<0.001), indicating the presence of micro pores. PTZ-Carbon exhibits type I isotherm typically seen in microporous materials. The surface area of the material was examined using Brunauer-Emmett-Teller (BET) model. The prepared carbon material shows an excellent specific BET surface area of 3,152 m² g⁻¹. The pore size distribution was analyzed using NLDFT analysis. The pore size measurements revealed a homogeneous pore size distribution for PTZ-Carbon_800 with dominant pore width at ~1 nm.

Figure 5A:
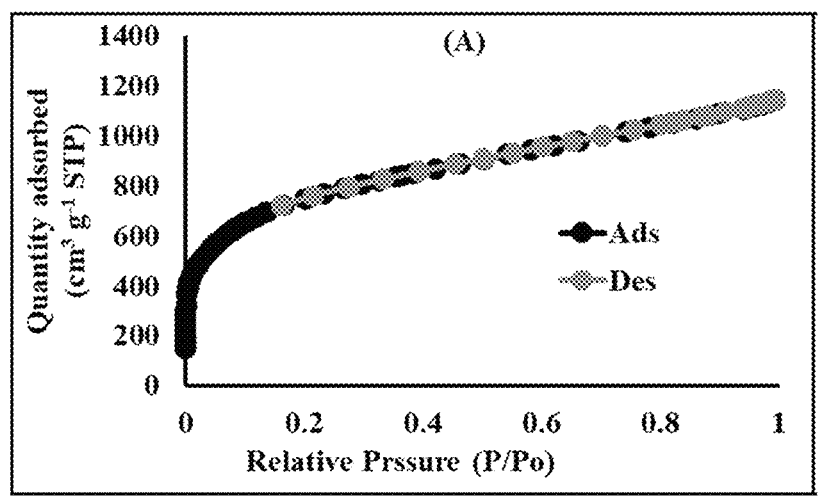
FIG. 5A is a graph showing $N_2$ sorption isotherm for the PTZ-Carbon.
Figure 5B:
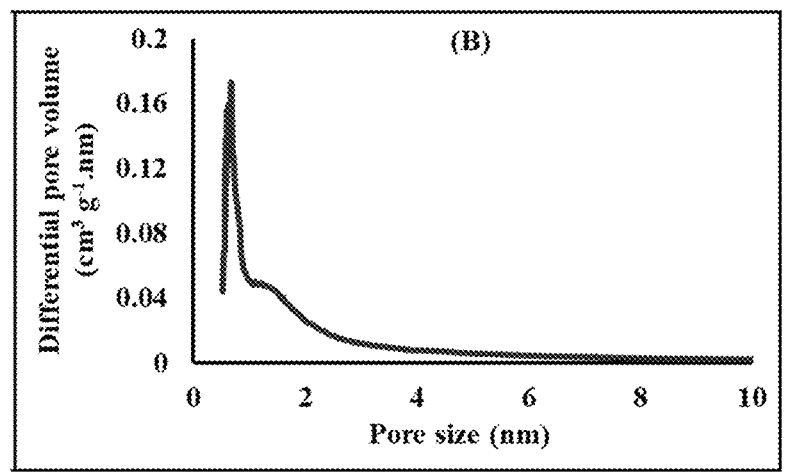
FIG. 5B is a graph showing the corresponding pore size distribution histogram of the PTZ-Carbon in FIG. 5A.
Figure 6A:
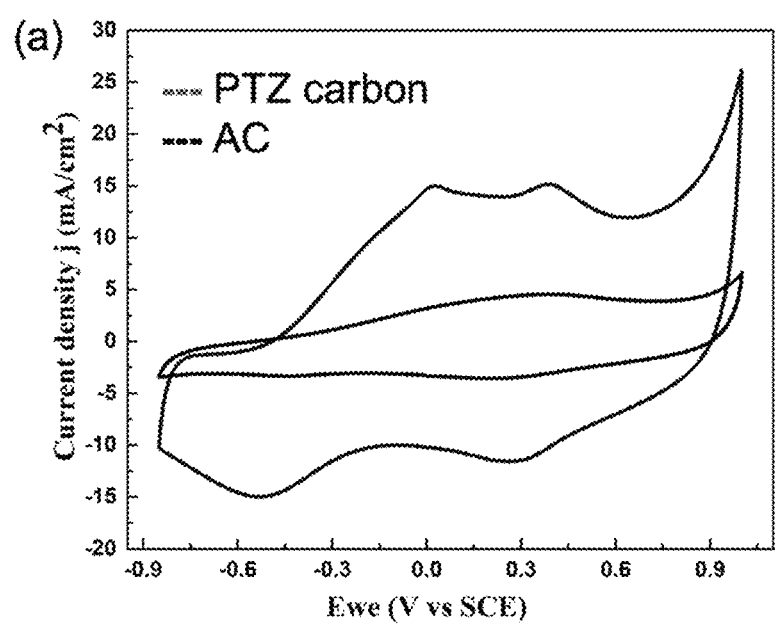
FIG. 6A is a graph showing cyclic voltammetry of PTZ-carbon as compared to commercial activated carbon, showing far enhanced charge storage inside the N/S-doped carbon, evidenced by the high capacitive current and presence of two redox peaks, scan rate 10 mV/s.
Figure 6B:
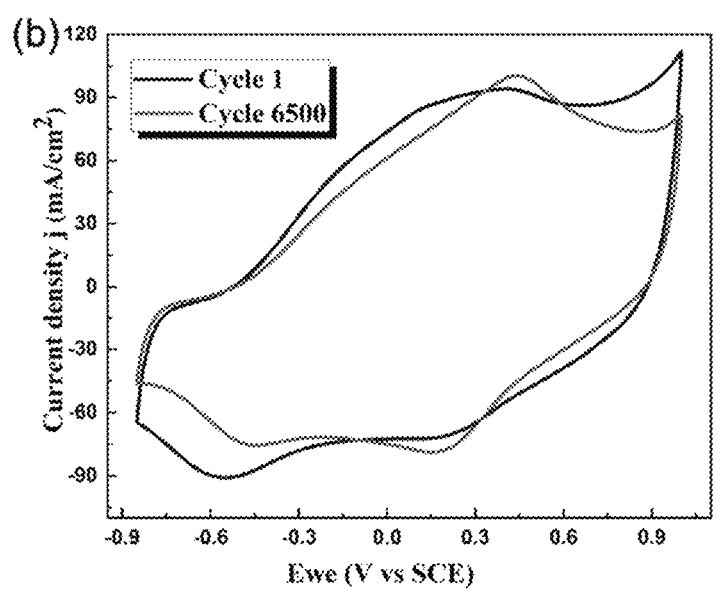
FIG. 6B is a graph showing cyclic voltammetry scan of an embodiment of the PTZ-carbon at the beginning of the durability test and after 6,500 cycles indicating excellent stability of the nitrogen/sulfur-rich activated carbon.

The PTZ-Carbon_800 was tested using cyclic voltammetry technique (CV) where the solid was prepared as an ink casted onto a glassy carbon electrode and tested in 1M $H_2SO_4$ aqueous solution. As a control experiment, the CV scans for commercial activated carbon AC were also recorded to compare the performance of the PTZ-Carbon, FIGS. 5A-5B. Interestingly, the CV scans recorded at a scan rate of 10 mV/s showed a far more enhanced capacitive current for the PTZ-Carbon, as compared to AC, where a specific capacity of 258.2 F·g⁻¹ was calculated for the PTZ-Carbon, as compared to only 125.5 F·g⁻¹ for commercial AC tested in the lab under essentially similar conditions. Moreover, the specific capacitance of the PTZ-Carbon_800 supersedes some of the best reported values for similar materials, as shown in Table 1. Interestingly, two reversible faradic processes were clearly detected in the PZT-Carbon_800 scans, with oxidation peaks observed at 50 mV, and 400 mV vs. Ag/AgCl reference electrodes, and corresponding reduction peaks at 280 mV and −486 mV, superimposed on large capacitive component. The faradic contribution from the N- and S-dopant species clearly contributed significantly to enhance the specific capacitance of the PTZ-Carbon as compared to the AC. To investigate durability of the PTZ-Carbon_800, a consecutive 6,500 CV scans were collected, FIGS. 6A-6B, where no degradation of the capacitive current was recorded. Interestingly a slight increase in performance of the PTZ-Carbon_800 was recorded upon extended cycling in the electrolyte, an observation that can be ascribed to activation of the pores of the PTZ-carbon_800 upon cycling in the electrolyte.

TABLE 1

Comparison of specific capacitance reported previously for AC measured under similar conditions utilized herein.

| Sample | Electrolyte | Scan rate | Potential Range (V) | Specific Capacitance (F/g) | Reference |
|---|---|---|---|---|---|
| PTZ-Carbon_800 | 1M $H_2SO_4$ | 10 mVs⁻¹ | −0.5:1 | 258.2 | This work |
| AC | 1M $H_2SO_4$ | 10 mVs⁻¹ | −0.5:1 | 151 | This work |
| AC fibers | 1M $H_2SO_4$ | 5 mVs⁻¹ | −0.6:0.4 | 175 | Leitner et al |
| Activated carbon felt | 1M $H_2SO_4$ 1M KOH | 20 mVs⁻¹ | 0:1.2 | 152 163 | Ma et al. |
| AC | 1M $Na_2SO_4$ | 10 mVs⁻¹ | 0:1 | 67 | Maher et al. |
| GF@MWNT | $H_2SO_4$ + PVA gel | 1 A/g | 0:1 | 177 | Yang et al. |
| O/N-atom @ meso-microporous AC | 5M KOH | 5 mVs⁻¹ | −1.0:1.0 | 190 | Hossain et al. |

It is to be understood that the method for preparing nitrogen/sulfur-rich activated carbon, and the resultant product and uses thereof, are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method for preparing nitrogen/sulfur doped activated carbon, the method comprising:
   preparing an aromatic oligomer including a heteroatom-containing monomer using an oxidative polymerization solution, wherein the oxidative polymerization solution comprises a first oxidizer and an organic solvent, the heteroatom-containing monomer being selected from the group consisting of nitrogen (N), sulfur(S), and a combination thereof;
   mixing the oligomer with an activating agent to obtain a mixture;
   subjecting the mixture to carbonization and activation in a tube furnace;
   holding the mixture at a set temperature for a period of time; and
   cooling the mixture to room temperature to obtain the nitrogen/sulfur doped activated carbon;
   wherein the organic solvent is selected from the group consisting of dimethylformamide, 1,2-dichloroethane, chloroform, 1,2-dichlorobenzene, nitromethane, tetrahydrofuran, N-methylpyrrolidone, dimethyl sulfoxide, nitrobenzene butyl nitrite, and a combination thereof.

2. The method of claim 1, wherein the oxidizer is selected from the group consisting of $FeCl_3$, $AlCl_3$, $FeBr_3$, and ammonium persulfate.

3. The method of claim 1, wherein the oligomers are prepared from monomers comprising a heteroatom selected from the group consisting of nitrogen (N), sulfur(S), and a combination thereof, the monomers being selected from the group consisting of thiazine, thiophene, aniline, pyrrole, tris-phenylamine, carbazole, and a combination thereof.

4. The method of claim 3, wherein the monomer is thiazine.

5. The method of claim 1, wherein the activating agent is selected from the group consisting of KOH, NaOH, $H_3PO_4$, $Na_2CO_3$, $K_2CO_3$, and $(NH_4)_2S_2O_3$.

6. The method of claim 1, wherein the heteroatom weight % ranges from about 0.1 wt % to about 20 wt %.

7. The method of claim 6, wherein the heteroatom weight % ranges from about 0.5 wt % to about 18 wt %.

8. The method of claim 7, wherein a weight % of the heteroatom in the activated carbon ranges from about 1 wt % to about 15 wt %.

9. The method of claim 1, wherein the nitrogen/sulfur activated carbon is a free-flowing black powder.

10. The method of claim 9, wherein the free-flowing black powder has a surface area exceeding 2,500 m²/g.

11. The method of claim 9, wherein the free-flowing black powder has a surface area exceeding 3,000 m²/g.

12. The method of claim 10, wherein the free-flowing black powder has a surface area exceeding 3.200 m²/g.

\* \* \* \* \*